(No Model.)
2 Sheets—Sheet 1.
T. A. GALT.
CORN HARVESTER.
No. 572,749. Patented Dec. 8, 1896.
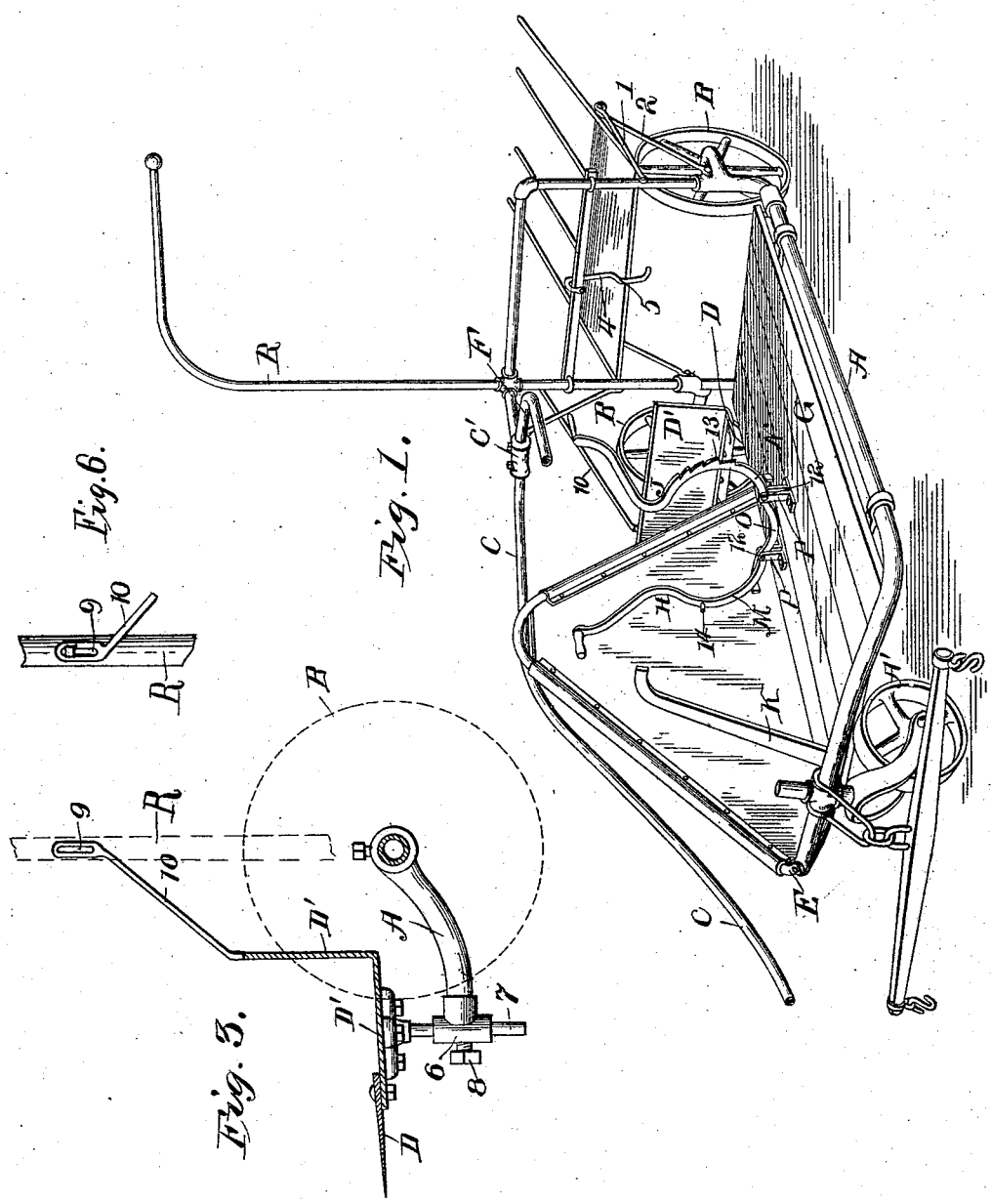
WITNESSES
Max Abel
A. C. Lewis
INVENTOR
Thomas A. Galt
By John G. Manahan.
Attorney (No Model.) 2 Sheets—Sheet 2.
T. A. GALT.
CORN HARVESTER.
No. 572,749. Patented Dec. 8, 1896.
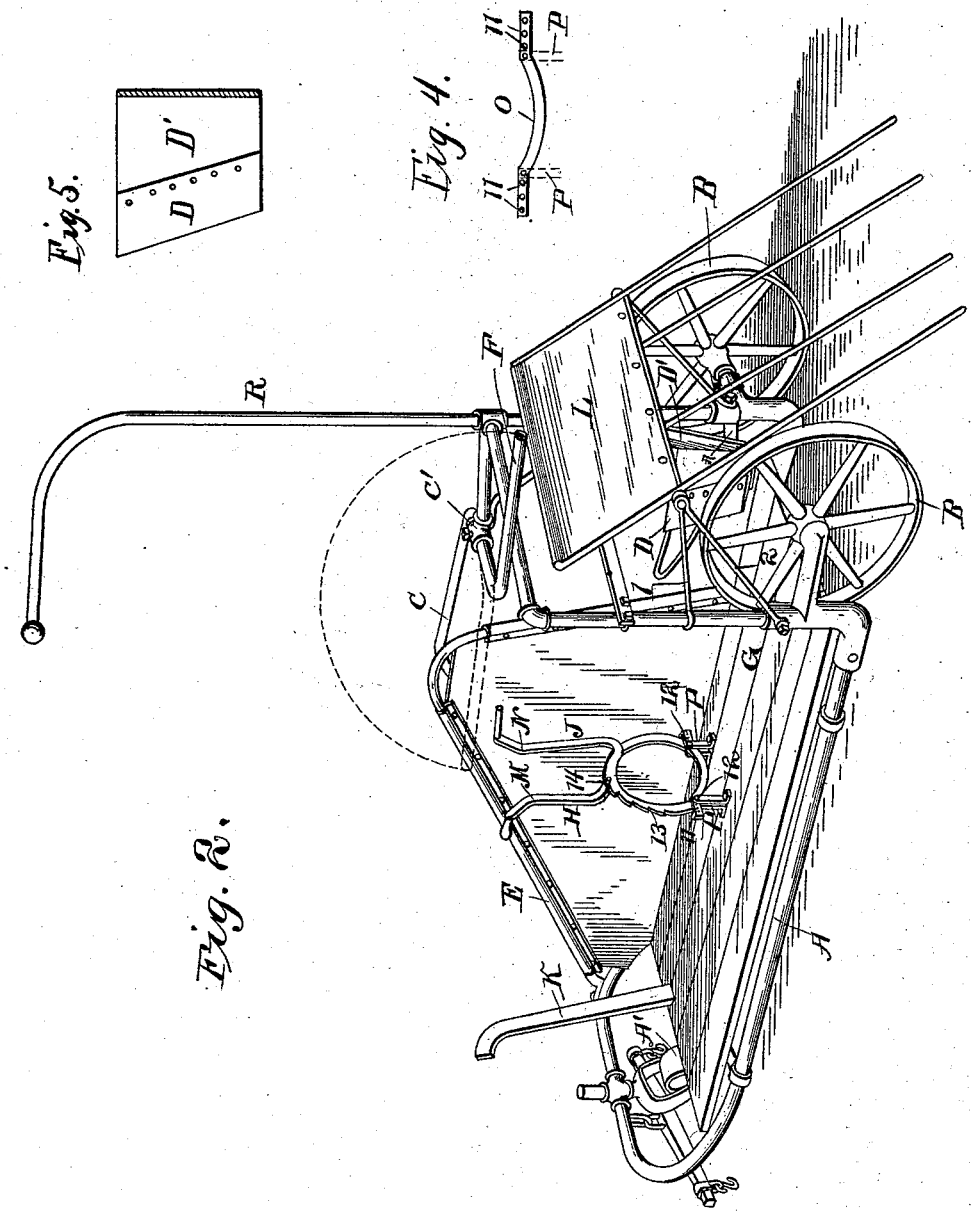
Witnesses:
Max Obel
H. C. Lewis
Inventor;
Thomas A. Galt,
By John G. Manahan.
Atty.

UNITED STATES PATENT OFFICE.

THOMAS A. GALT, OF STERLING, ILLINOIS.

CORN-HARVESTER.

SPECIFICATION forming part of Letters Patent No. 572,749, dated December 8, 1896.

Application filed May 28, 1896. Serial No. 593,470. (No model.)

*To all whom it may concern:*

Be it known that I, THOMAS A. GALT, a citizen of the United States, residing at Sterling, in the county of Whiteside and State of Illinois, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in corn-harvesters, and pertains, first, to providing a cheap, simple, and convenient machine for cutting off cornstalks, of a character, size, and expense which will enable each individual farmer to provide himself therewith; second, an adjustable compressor to assist in hand-binding into bundles the fodder as the stalks are cut, and, third, a means for vertically adjusting the cutting-knife. I attain these results by the construction shown in the accompanying drawings, in which—

Figure 1 is a perspective of a machine embodying my invention, the view being obliquely from the front, the bundle-carrier being in a receptive position. Fig. 2 is the same, the view being obliquely from the rear and the bundle-carrier being in position of discharging its load. Fig. 3 is a detail of the mechanism for adjusting the cutting-knife vertically. Fig. 4 is a detail view of a part of the binder, and Figs. 5 and 6 are broken detail views of the knife and the means for adjusting it.

Similar letters refer to similar parts in each of the several views.

A is the frame of the machine, (shown in the drawings as constructed of tubing,) but the same may be constructed of bar iron or steel. The frame A is supported on the front caster-wheel A' and the rear carrying-wheels B B.

C is a slightly-divergent stalk-gatherer, which extends from a point slightly forward of the machine back to a sleeve C', properly supported on the frame of the machine above and to the rear of the knife D.

The front corner E of the frame A is given an oblique elevation substantially conformable to that of the gatherer C and assists the latter in gathering and guiding the stalks to the knife D. The latter is set slightly diagonal of the rows in position to be drawn through and sever the stalks as the machine is driven forward.

A reversible bowed arm F, together with the vertical plate D', assists to guide the stalks around onto the platform G after said stalks are severed in position to fall forward between the arms H and J of the bundle-compressor. A guide-standard K, seated on the front of the machine, serves to gather the tops of the stalks into a bunch against the vertical side of the machine and holds said stalks from interfering with the horse. For convenience the extension F is swiveled in the collar C', so as to be thrown backward out of the way of the binder, as shown in Fig. 2.

The bundle-carrier L is hinged to the rear of the frame A by means of the horizontal arm 1 and diagonal arm 2 and held in place for use by a lock 4, attached to the central part of the rear of the frame A and provided with a recess 5 to hold the carrier in its elevated position.

Referring to Fig. 3, a vertical sleeve 6 is formed on the frame A, through which is projected vertically the stem 7, upon the upper end of which is seated the knife-plate D', carrying the knife D. A set-screw 8, seated in the wall of the sleeve 6, holds the stem 7 and the knife-plate D' at any desired altitude. A vertical slot 9 in the brace 10, by which the upper end of the plate D' is attached to the frame A, permits of the aforesaid adjustment.

The binder H consists of two suitably-curved levers M and N, respectively pivoted a short distance apart at their lower ends to a cross-bar O, supported suitably on standards P P. The bar O at each end is provided with a series of openings 11 for the reception of the bolts 12 12, respectively, which form the pivots for the lower ends of the binding-levers M and N, and thereby the distance between said binding-arms can be increased or diminished to adapt their compression to bundles of different sizes. On the periphery of the bowed portion of the lever N there are formed notches 13, which are engaged by a short stud 14, formed on the opposite lever M to hold the fodder in the compressed condition for binding. The vertical post R, projected horizontally across the rear of the machine, permits of the ends of the lines being tied or otherwise secured thereto, and thereby serves as a convenient and permanent holder of the rear ends of the lines, so that the operator in the intervals of binding is in no way delayed or troubled looking after the lines, and the latter are in convenient reach of the driver to guide or stop the horse.

As the bundles are bound, either by twine or otherwise, they are thrown over onto the carrier L until any desired number has accumulated thereon, when said carrier is tilted, as shown in Fig. 2, the bundles discharged, and the carrier relocked in the position shown in Fig. 1.

What I claim as my invention, and desire to secure by Letters Patent of the United States, is—

1. The combination of the frame A provided with stalk-gathering sides E, the gatherer C, knife D, plate D', reversible stalk-guide F, and the binder H, substantially as shown and for the purpose described.

2. The combination of the knife-bearing stem 7, plate D', knife D seated thereon, sleeve 6, brace 10 provided with a vertical slot 9, and a set-screw 8, substantially as shown and for the purpose specified.

3. The combination of the bar O provided with transverse openings 11, 11, and suitably supported on standards P, binding-levers M and N provided with bolt-openings in their lower ends, and the transverse bolts 12 adapted to be passed through the said openings in said levers, and through any of the openings 11, respectively, substantially as shown and for the purpose described.

In testimony whereof I affix my signature in presence of two witnesses.

THOMAS A. GALT.

Witnesses:
JOHN G. MANAHAN,
ISABELLE MANAHAN.